Patented Jan. 16, 1923.

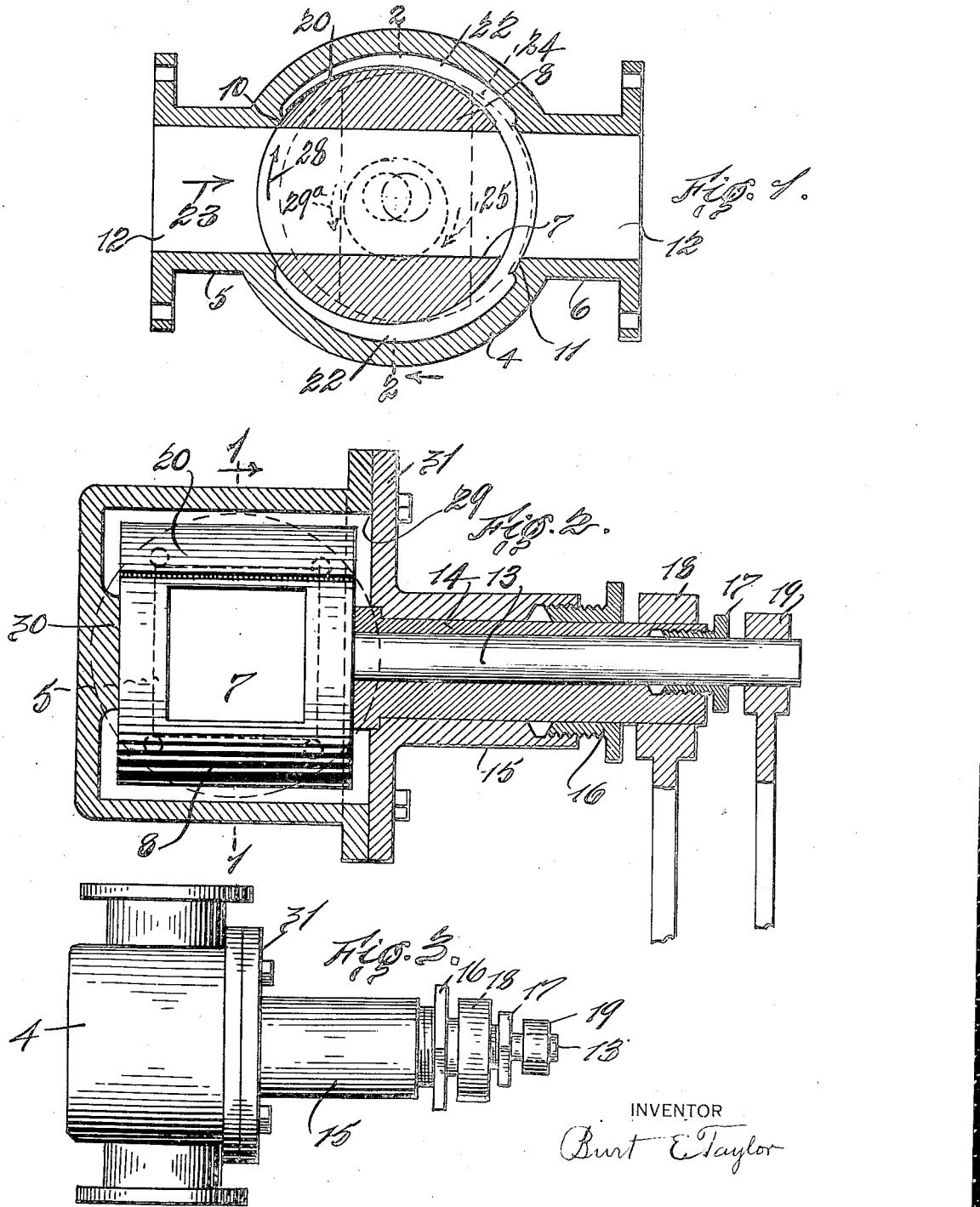

1,442,452

UNITED STATES PATENT OFFICE.

BURT E. TAYLOR, OF MOUNT VERNON, NEW YORK, ASSIGNOR TO THE BORDEN COMPANY, OF NEW YORK, N. Y., A CORPORATION OF NEW JERSEY.

VALVE.

Application filed February 8, 1919, Serial No. 275,697. Renewed September 28, 1922. Serial No. 591,079½.

*To all whom it may concern:*

Be it known that I, BURT E. TAYLOR, a citizen of the United States, residing at Mount Vernon, county of Westchester, State of New York, have invented a new and useful Improvement in Valves, of which the following is a specification.

This invention relates to improvements in valves, that is to say, shut off valves. One of the objects of my invention is to provide a valve of simple construction which is especially adapted for high pressure of vacuum purposes. To carry my invention into practice, I provide a rotary valve in combination with means to exert pressure thereupon to force it against its seat, said pressure exerting means being operable independently of the means to rotate the valve. In practice, I prefer to provide the casing of the valve with a plurality of seats, either of which may be used. In the drawing which forms part of this specification :—

Fig. 1 illustrates a cross sectional view of my improved valve, the section being taken on a line 1—1 in Fig. 2;

Fig. 2 is a longitudinal sectional view thereof, the section being taken on a line 2—2 in Fig. 1; and Fig. 3 is a top plan view thereof on a reduced scale.

As herein arranged, my improved valve consists of a casing 4 having flanged ducts 5 and 6 extending therefrom with which the passage 7 in a valve 8 will aline when the valve is turned to the open position. The bore of the casing carries valve seats 10 and 11 which surround the passages 12 through the ducts 5 and 6. The valve 8 is of the rotatory type carried by a spindle or stem 13 which in turn is carried by a bushing 14 rotatably supported by a neck 15 having a stuffing box 16. The bushing 14 carries a stuffing box 17 in order to pack the spindle 13. To rotate the bushing 14, I provide a lever or handle 18, and to rotate the valve 8, I provide the stem 13 with a lever or arm 19.

As can be seen in Fig. 1 the bushing 14 is mounted eccentrically with respect to the axis of the casing 4; hence when the bushing 14 is rotated the valve 8 will be moved bodily to the right or left, or toward the valve seat 10 or 11, depending upon the direction of rotation of the said bushing.

From the foregoing it will be apparent that the actuation of the valve 8 involves, in this instance, two operations, that of rotating the valve to open or close it and that of rotating the bushing 14 to force the valve against either seat 10 or 11 to render the line in which the valve is placed absolutely tight.

To form a tight joint, I provide the valve 8 with a facing 20 which may be of leather or any other suitable material or substance which, when forced against the valve seats, will form a tight joint. Considerable pressure can be applied to the valve by the eccentrically mounted bushing; hence the facings will be forced firmly against the seats. The dotted lines, Fig. 1, illustrate the valve in closed position. My improved valve will be found very effective for high pressure service, and also for use in lines under vacuum. A further feature of my invention is that pressure upon the valve, due to the pressure of the gases or liquids in the ducts connected with the valve, does not act to force the valve against its seats, said pressure being supplied only through the agency of the bushing 14, as said valve is carried by bushing 14 and is not free to move in the direction of either seat 10 or 11 unless the bushing is rotated. As can be seen in Fig. 1 there is a space 22 between the greater part of valve 8 and the casing 4 when said valve is closed; hence the pressure of the gases or liquids in the line will not prevent the valve from being moved off its seats, the direction of flow of the gases or liquids being indicated by the arrow 23 in Fig. 1.

Should the valve be closed, as indicated by dotted lines 24 in Fig. 1, and should I desire to open said valve, I would rotate bushing 14 by means of the lever 18 in the direction of the arrow 25. This operation would move the valve off its seat 11 after which said valve can be rotated, by means of the handle 19, to the position indicated by full lines in said Fig. 1, which would open the line. To close the valve it would be rotated in the direction of the arrow 28, one quarter of a revolution after which the bushing would be rotated in the direction of the arrow 29ª which movement would force the facing against seat 11. If desirable, the directions of the movements above described could be reversed and the valve seat 10 utilized instead of seat 11.

As can be seen in Fig. 2, the valve 8 is inserted through the open side 29 of the casing 4 and bears, at its inner end, against a lug 30. The open side of the casing 4 is closed by a plate 31, which carries the neck 15, after the valve has been inserted. The inner end of the bushing 14 bears against the adjacent end of valve 8.

Having described my invention, what I claim is:—

1. The combination of a casing having a duct connected therewith, an eccentrically mounted valve in said casing arranged to obstruct said duct, and also to permit free passage through said duct, means to operate the valve and independently acting means to force the valve against its seat.

2. The combination of a casing having a duct connected therewith, a rotary eccentrically mounted valve in said casing having an opening therethrough, means to rotate the valve to cause the opening therethrough to aline with said duct or to move out of register with said duct, and independently acting means to force the valve against its seat.

3. The combination of a casing having passages extending from opposite sides thereof, a valve in said casing, a valve seat surrounding the mouth of each passage, and eccentric means to bodily move the valve in parallelism with the axis of said passages away from one of said seats and force same against the opposite seat.

4. The combination of a casing having passages leading therefrom, a valve seat surrounding each passage, an eccentrically mounted valve in said casing having a duct therethrough, means to rotate the valve to cause the passage therethrough to register with either one of said passages, and means to move the valve longitudinally of the casing and force same against the valve seat surrounding the passage with which the duct in said valve is caused to register.

5. The combination of a casing having a passage leading therefrom, a valve seat surrounding said passage, a rotatable bushing carried by the casing, said bushing being mounted eccentrically with respect to the transverse axis of the casing, a valve in the casing, a stem carried by the valve rotatably supported by said bushing, means to rotate the bushing, and means to rotate said valve.

6. The combination of a casing having a passage leading therefrom, a valve seat surrounding said passage, a rotatable bushing carried by the casing, said bushing being mounted eccentrically with respect to the transverse axis of the casing, a valve in the casing, a stem carried by the valve rotatably supported by said bushing, means to rotate the bushing, means to rotate said valve, and a facing carried by the valve to cooperate with said valve seat to form a tight joint.

7. A valve device comprising a casing having a duct, a rotatable valve carrying a stem concentric therewith and extending to outside of the casing, and a rotatable bushing also extending to outside of the casing and within which bushing said stem is eccentrically mounted.

In testimony whereof, the said BURT E. TAYLOR has signed his name to this specification in the presence of two subscribing witnesses, this 7th day of February 1919.

BURT E. TAYLOR.

Witnesses:
BERTHA HALEN,
MAURICE BLOCK.